United States Patent

[11] 3,591,906

| [72] | Inventor | Hans-Jurgen Leiber<br>Tramelan, Switzerland |
|---|---|---|
| [21] | Appl. No. | 836,096 |
| [22] | Filed | June 24, 1969 |
| [45] | Patented | July 13, 1971 |
| [73] | Assignee | Kummer freres S. A. Fabrique de machines<br>Tramelan Canton of Berne, Switzerland |
| [32] | Priority | Aug. 29, 1968 |
| [33] | | Switzerland |
| [31] | | 12,930/68 |

[54] METHOD FOR THE INSTALLATION OF GUIDE RAILS AND ROLLER ELEMENTS OF A ROLLER SLIDING BEARING ARRANGEMENT
8 Claims, 7 Drawing Figs.

[52] U.S. Cl. .................................................. 29/148.4 A, 29/149.5 NM
[51] Int. Cl. ..................................................... B23p 11/00
[50] Field of Search.......................................... 29/148.4, 149.5 NM, 148.4 A, 149.5

[56] References Cited
UNITED STATES PATENTS

| 2,675,276 | 4/1954 | Daugherty.................. | 29/149.5 NM |
| 3,245,512 | 4/1966 | Heyer......................... | 29/148.4 A |

*Primary Examiner*—Thomas H. Eager
*Attorney*—Werner W. Kleeman

ABSTRACT: There is disclosed an improved method for the installation of guide rails and roller elements of a roller sliding bearing arrangement for two body members which are to be displaceably mounted at one another, wherein a predetermined preloading is to be provided for such roller elements, and wherein both of the body members are temporarily fixedly retained with the aid of a mounting device in a desired position with respect to one another. The inventive method contemplates the formation of a hollow space which is closed throughout its entire periphery between each guide rail and the neighboring portion of one of the body members. The dimension of the space between the contact surface of each guide rail and the oppositely situated contact surface of the other of the body members is adjusted, while taking into account the diameter of the roller elements to be used and the desired preloading to which said roller elements should be subjected during operation. Thereafter, each hollow space is filled with a suitable casting resin, with the body members and guide rails thusly adjusted. The casting resin is then permitted to harden and after having hardened, the roller elements are inserted.

PATENTED JUL 13 1971 3,591,906

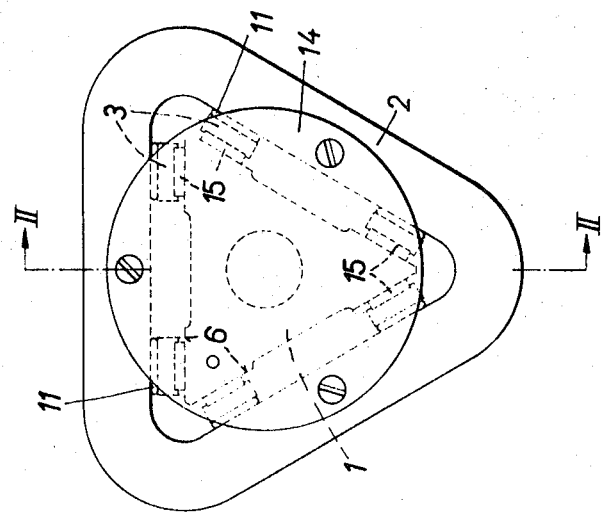
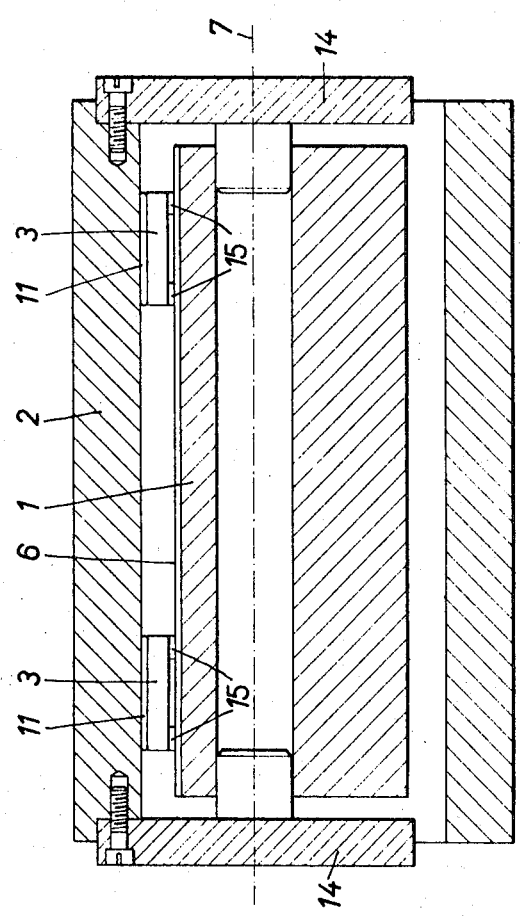

METHOD FOR THE INSTALLATION OF GUIDE RAILS AND ROLLER ELEMENTS OF A ROLLER SLIDING BEARING ARRANGEMENT

BACKGROUND OF THE INVENTION

The present invention relates to a new and improved method for the installation of guide or runway rails and roller elements of a roller sliding bearing arrangement for two body members which are to be displaceably mounted at one another, wherein a predetermined preloading is to be provided for these roller elements, and further wherein both of said body members are temporarily fixedly retained with the aid of a conventional or suitable mounting device in a desired position with respect to one another.

It is already known in the art to use a casting resin for the purpose of affixing the housings of ball or roller bearings, the inner race of which has already been pressed onto a shaft, in the openings provided for such purpose at the machine housings. During the introduction and hardening of the casting resin, the shaft, together with the bearing means carried thereby, is appropriately supported at the housing by means of a suitable mounting device. Such techniques are, for instance, described in detail in the publication "VDI-Richtlinien 'Giessharz im Schnitt- und Stanzwerkzeugbau VDI 3369'"

Furthermore, structural units, for instance so-called needle carriages, are available on the market. They possess a multiplicity of roller elements and an associated cage which, for instance, is flat, and by means of which it is possible to obtain very rigid, extremely precise, low-friction and compact longitudinal guide arrangements. However, up to the present, the use of such structural units was not readily possible in many instances because it was virtually impossible to mount them in such a way that their roller elements during operation would be subjected to an exactly predetermined preloading. Depending upon the direction and sense of the loading of the components to be guided, the roller elements at such location would be loaded or unloaded. If the preloading of such roller elements was too small, then, in their unloaded condition they would be free, that is to say, they would no longer bear against both of their guideways or guide tracks. Hence, under such condition, the roller element would no longer be entrained by the moving component and would assume with respect to such component a completely uncontrolled position. This, in turn, would result in malfunction of the longitudinal guide arrangement. On the other hand, if the preloading is too great, then such has a direct unfavorable affect on the longevity of the roller elements and their guideways or tracks. In order to obtain a preloading of the roller elements, it is necessary to maintain the dimension between the guide tracks smaller than the diameter of the roller elements; for instance, for a known and commercially available needle carriage, the reduction of such dimension amount to 0.25 $\mu$ per 100 kg. preloading. It is for this reason understandable that attempts to adjust such preloading with screws or wedges has not provided the desired results.

SUMMARY OF THE INVENTION

Accordingly, it is a primary object of the present invention to provide an improved method for the installation of guide rails and roller elements of a roller sliding bearing arrangement or equivalent structure, which effectively overcomes the aforementioned drawbacks and disadvantages of the prior art techniques and constructions.

Still, another more specific object of the present invention relates to an improved method of the previously mentioned type which can be carried out in practice easily and economically, wherein the dimension tolerances for the components which are to be installed, apart from the roller elements, have only placed upon them demands which can be easily fulfilled.

Now, in order to implement these and still further objects of the invention, which will become more readily apparent as the description proceeds, the inventive method is manifested by the features that between each guide rail and the neighboring portion of that body member of both said body members against which is supported said guide rail, there is formed a hollow space which is closed throughout its entire periphery. An inflow bore and a venting or aeration bore communicates with each such closed, hollow space. After the aforesaid desired position of the body members has been fixed in relation to one another, there is adjusted by means of end or precision gauge block elements, or equivalent structure, the dimension of the space between the contact surface of each guide rail and the oppositely situated contact surface, while taking into account the diameter of the roller elements to be used and the desired preloading to which such roller elements should be subjected during operation. Then, with the body members and guide rails thusly adjusted or positioned, each hollow space is filled with a casting or pourable resin. This casting resin is then allowed to harden and after hardening thereof, the aforesaid mounting device and block elements are removed, and the roller elements are then rolled in.

It should be understood that the inventive method can be distinguished in both purpose, as well as solution, from the previously mentioned known techniques. It influences the bearing arrangement itself since, with the inventive technique, there is not fixed in its final position, an already finished bearing (ball or roller bearing) by pouring out a casting resin, rather the bearing arrangement itself is provided with a predetermined preloading.

A preferred manifestation of the inventive method resides in the use of a rubber-elastic closed or endless ring member for the purpose of forming each hollow space between a given guide rail and the associated aforesaid neighboring body portion.

Furthermore, in this context, it is mentioned that after the insertion of each ring member, the associated guide rail is temporarily displaced by compressing the associated ring member through the action of two screw members, or equivalent structure, which pass through the corresponding hollow space and engage with blind holes of such associated guide rail, in order to enable insertion of the block elements. Upon insertion of such block elements, and after removal of both of the screw members, the block elements determine the dimension of the space between the guide rail and the oppositely situated guide surface.

Furthermore, the invention advantageously contemplates the use of platelike or shaped end or precision gauge block elements and a casting resin, which upon hardening, contracts a predetermined amount in consideration of the desired thickness of the employed platelike block elements, in order to facilitate removal of such platelike block elements upon completion of the hardening of the filled casting resin.

BRIEF DESCRIPTION OF THE DRAWINGS

The invention will be better understood, and objects other than those set forth above, will become apparent, when consideration is given to the following detailed description thereof. Such description makes reference to the annexed drawings wherein:

FIG. 2 illustrates one of the stages of the inventive method, wherein the components are depicted in sectional view taken along substantially the line II–II of FIG. 3;

FIG. 3 is an end view of the roller slide bearing arrangement of FIG. 2;

DESCRIPTION OF THE PREFERRED EMBODIMENTS

Figure 1:
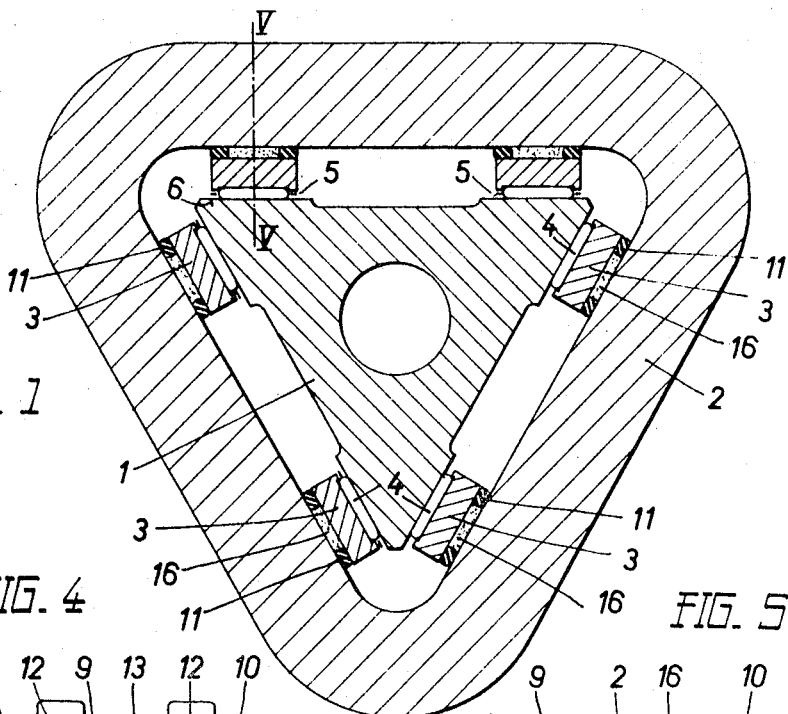
FIG. 1 is a cross-sectional view of a finished mounted roller slide bearing arrangement produced according to a preferred embodiment of the inventive method.

Describing now the drawings, it will be understood that reference numeral 1 designates the inner body member and reference numeral 2, the outer body member of two body members, 1, 2 which are to be mounted at one another through the agency of a roller slide bearing arrangement. Furthermore, reference numeral 3 designates the guide rails, reference number 4, the roller bearing needles, and reference numeral 5, the cage means for such. The flat or planar guide surfaces 6 for the needles 4 provided at the body member 1 are constructed to be parallel with the greatest possible accuracy with respect to the longitudinal axis 7 (FIG. 2) of such body member 1.

According to an exemplary embodiment of the inventive method, during installation of the guide rails 3, one proceeds as hereinafter described, whereby it is presupposed that each guide rail 3 is initially provided at its ends with blind threaded holes 8 and the outer body member 2 is provided with appropriate open-ended screw-receiving bores or holes 9 and 10.

Figure 4:
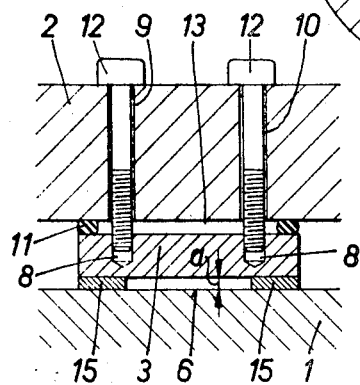
FIG. 4 is a fragmentary enlarged view of a portion of the arrangement depicted in FIG. 2.

While inserting between each of the guide rails 3 and the body member 2 an endless sealing band 11 or the like which is closed within itself and formed of rubber-elastic material, each such guide rail 3 is secured to the body member 2 by means of two screws 12 which engage in the threaded holes or bores 8 and further pass through the hollow space 13 closed completely around by the sealing band 11, such screws also passing through the bores 9 and 10, as best shown by referring to FIG. 4.

As best recognized by referring to FIG. 3, prior to or after this operation, and by means of a suitable mounting device of known construction which possesses the components 14, the body member 1 is temporarily fixed in relation to the body member 2 in the desired position. In the illustrated embodiment, this fixation of the body members 1 and 2 relative to one another is undertaken in such a way that they exhibit one and the same lengthwise axis 7.

Thereafter, there are inserted for each guide rail 3 two, for instance, plate-shaped end or precision gauge block elements 15, or equivalent structure, the thickness of which—dimension a—is chosen in consideration of, or with respect to, the diameter of the roller bearing needles 4 which are to be used while taking into consideration the desired preloading to which these needles should be subjected after installation.

Then, all of the screw members 12, or equivalent structure, are removed. The guide rails 3 still press the end block elements 15 against the guide surfaces 6 formed at the body member 1 under the influence of the reaction of the ring member 11 which is still subjected to a clamping action.

During this operational phase, if necessary, there could still be undertaken a slight positional correction of the body members 1 and 2 with respect to one another by means of the mounting device which, for the time being, is still disposed in its operable position.

Now, the hollow space 13 together with the threaded blind holes 8 and the bores 9 and 10 are filled with a suitable casting or pourable resin, for instance one which is commercially available on the market under the trade designation "ARALDIT CW 214." During this operation, one of the holes 9 or 10 of each guide rail 3 serves as an inflow or filling bore and the other as a venting or aeration bore.

Figure 5:
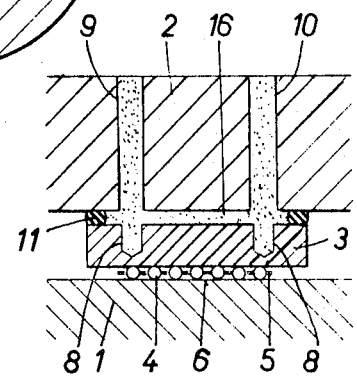
FIG. 5 is a sectional view of the arrangement shown in FIG. 1, taking substantially along the lines V–V thereof.

After hardening of this casting resin filling—as best shown by inspecting FIG. 5 and as indicated by reference numeral 16—the position of the guide rails 3 is definitely fixed. Now, the applied mounting device, the end block elements 15 and the body member 1 are removed. Thereafter, the body member 1, together with the group of bearing needles 4 and the associated cages 5 are rolled in.

In order to facilitate the just mentioned removal of the end block elements 15, it is advantageous to select a casting resin which contracts or shrinks a certain amount during hardening. However, this must be exactly determined in advance for the given strength of the filling 13, and during the selection of the thickness $a$ of the end block elements 15 which are employed, such must also be taken into consideration.

It is to be understood that the exemplary described method of the invention disclosed herein can be modified in many different ways and can be used for other cross-sectional configurations of the body members 1 and 2 and for other numbers and arrangements of the roller slide bearing elements, whereby instead of needles, under circumstances, it would also be possible to use rollers or balls.

It is also conceivable to employ needle- or roller-shaped end block elements, whereby there can be used a casting resin which does not contract during hardening.

Figure 6:
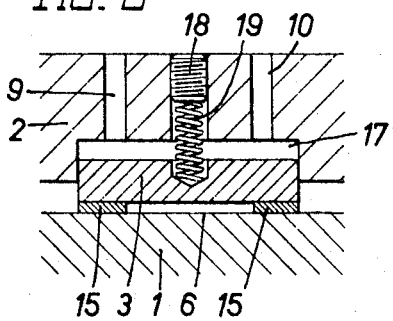
FIGS. 6 and 7 depict in fragmentary or partial sectional views, corresponding to the fragmentary sectional view of FIG. 4, further respective modifications of the invention.
Figure 7:
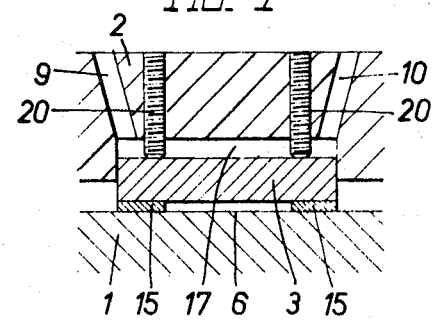

The use of the ring member 11 for attaining the hollow spaces or compartments 13 is generally favored as a simple and inexpensive expedient; however, it is to be understood, and as shown in FIGS. 6 and 7, also different possibilities are available to obtain the hollow spaces which are closed all around or throughout their entire respective periphery. Such hollow spaces are designated in FIGS. 6 and 7 by reference character 17, and are provided by inserting the guide rails 3 in appropriately dimensioned recesses of the body member 2. In the variant form of the invention shown in FIG. 6, there is provided a spring member 19 which bears against a threaded pin 18 for the purpose of pressing each guide rail 3 against the end block elements 15, whereas in the further modified arrangement of FIG. 7, for this purpose, there are used two threaded pin members 20, as shown.

It should be apparent from the foregoing detailed description that the objects set forth at the outset to the specification have been successfully achieved.

Accordingly, What I claim is:

1. A method for the installation of guide rails and roller elements of a roller sliding bearing arrangement for two body members which are to be displaceably mounted at one another, wherein a predetermined preloading is to be provided for said roller elements, and wherein both of said body members are temporarily fixedly retained with the aid of a mounting device in a desired position with respect to one another, the improvement comprising the steps of:
   a. forming a hollow space which is closed throughout its entire periphery between each guide rail and the neighboring portion of that body member of both said body members against which is supported said guide rail;
   b. providing an inflow bore and a venting bore which communicate with said closed hollow space;
   c. after said desired position of said body members has been fixed with respect to one another, adjusting by means of gauge block elements the dimension between the contact surface of each guide rail and the oppositely situated contact surface while taking into account the diameter of the roller elements to be used and the desired preloading to which said roller elements should be subjected during operation;
   d. then filling each hollow space with a casting resin with said body members and guide rails thusly adjusted;
   e. allowing said casting resin to harden and after hardening thereof removing the aforesaid mounting device and said gauge block elements; and
   f. then rolling-in said roller elements.

2. A method as defined in claim 1, wherein for the formation of each hollow space there is employed a substantially rubber-elastic endless ring member which is inserted between the associated guide rail and said neighboring body member portion.

3. A method as defined in claim 2, wherein subsequent to insertion of each of said ring members, the associated guide rail is temporarily displaced by compressing the associated ring member through the action of two screw members which pass through the associated hollow space and engage with blind holes of said associated guide rail, in order to enable insertion of said gauge block elements, whereby upon insertion of said gauge block elements, and after removal of both of said screw members said gauge block elements determine the dimension of the space between said guide rail and the oppositely situated contact surface.

4. A method as defined in claim 1, including the step of using platelike gauge block elements and a casting resin which upon hardening contracts a predetermined amount in consideration of the desired thickness of the employed platelike gauge block elements, in order to facilitate removal of said platelike gauge block elements upon completion of the hardening of said casting resin.

5. A method for the installation of guide rails and roller elements of a roller sliding bearing arrangement for two body members which are to be displaceably mounted at one another, wherein a predetermined preloading is to be provided for said roller elements, the improvement including the steps of:
  a. forming a hollow space which is closed throughout its entire periphery between each guide rail and the neighboring portion of one of said body members;
  b. adjusting the dimension of the space between the contact surface of each guide rail and the oppositely situated contact surface of the other of said body members, while taking into account the diameter of the roller elements to be used and the desired preloading to which said roller elements should be subjected during operation;
  c. then filling each such hollow space with a casting resin;
  d. allowing said casting resin to harden and after hardening thereof;
  e. then inserting said roller elements.

6. A method as defined in claim 5, wherein for the formation of each hollow space there is employed a substantially rubber-elastic endless ring member which is inserted between the associated guide rail and said neighboring body member portion.

7. A method for the installation of guide rails and roller elements of a roller sliding bearing arrangement for two body members which are to be displaceably mounted at one another, wherein a predetermined preloading is to be provided for said roller elements, comprising the steps of:
  a. temporarily fixedly retaining said two body members in a desired position with respect to one another;
  b. forming a hollow space which is closed throughout its entire periphery between each guide rail and the confronting portion of one of said body members;
  c. regulating a desired dimension of the space between a contact surface of each guide rail and the oppositely situated contact surface of the other of said body members;
  d. then filling each said hollow space with a casting resin;
  e. allowing said casting resin to harden and after hardening thereof;
  f. inserting said roller elements.

8. A method for the installation of guide rails and roller elements of a roller sliding bearing arrangement for two body members which are to be displaceably mounted at one another, wherein a predetermined preloading is to be provided for said roller elements, comprising the steps of:
  a. forming a hollow space which is closed throughout its entire periphery between each guide rail and the confronting portion of one of said body members;
  b. temporarily fixedly retaining said two body members in a desired position with respect to one another;
  c. regulating a desired dimension of the space between a contact surface of each guide rail and the oppositely situated contact surface of the other of said body members;
  d. then filling each said hollow space with a casting resin;
  e. allowing said casting resin to harden and after hardening thereof;
  f. inserting said roller elements.